INVENTORS
ALBERT J. SARKA
LOUIS P. TOTH

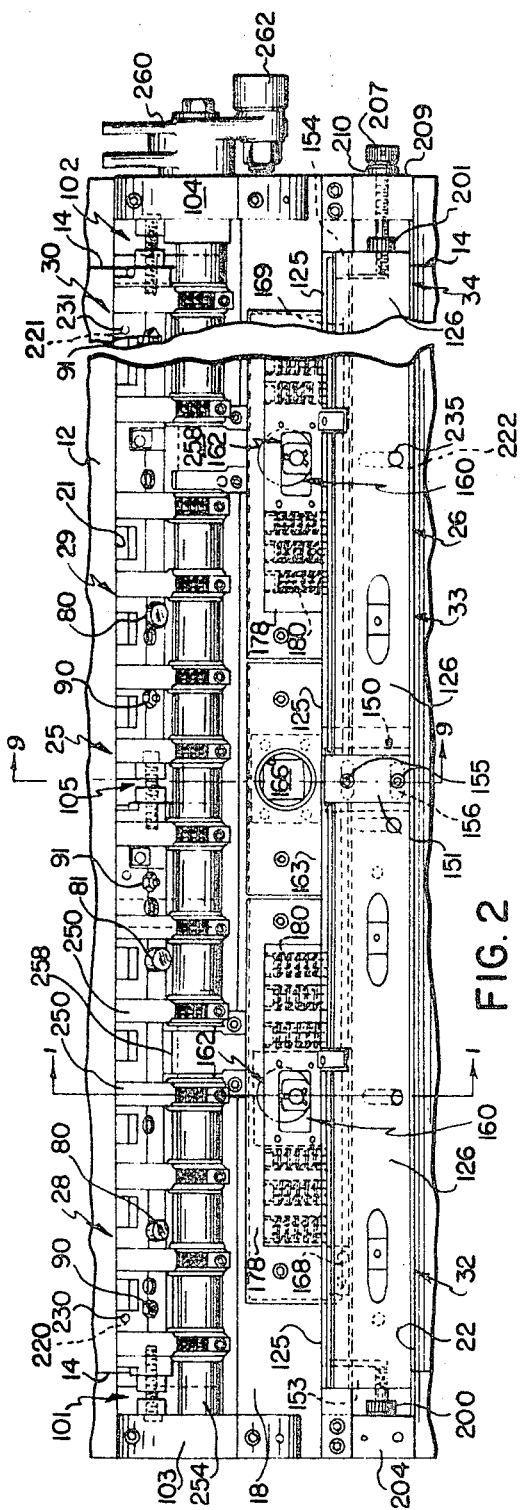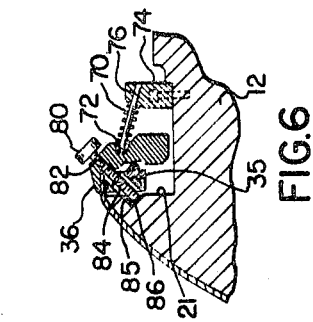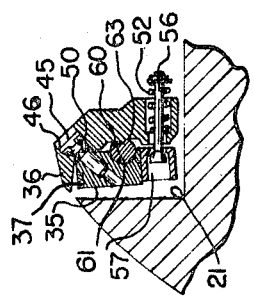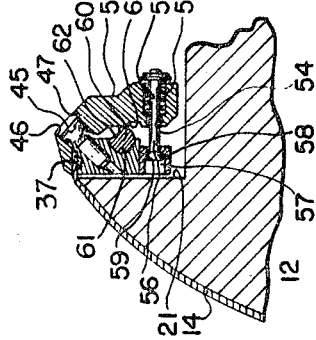

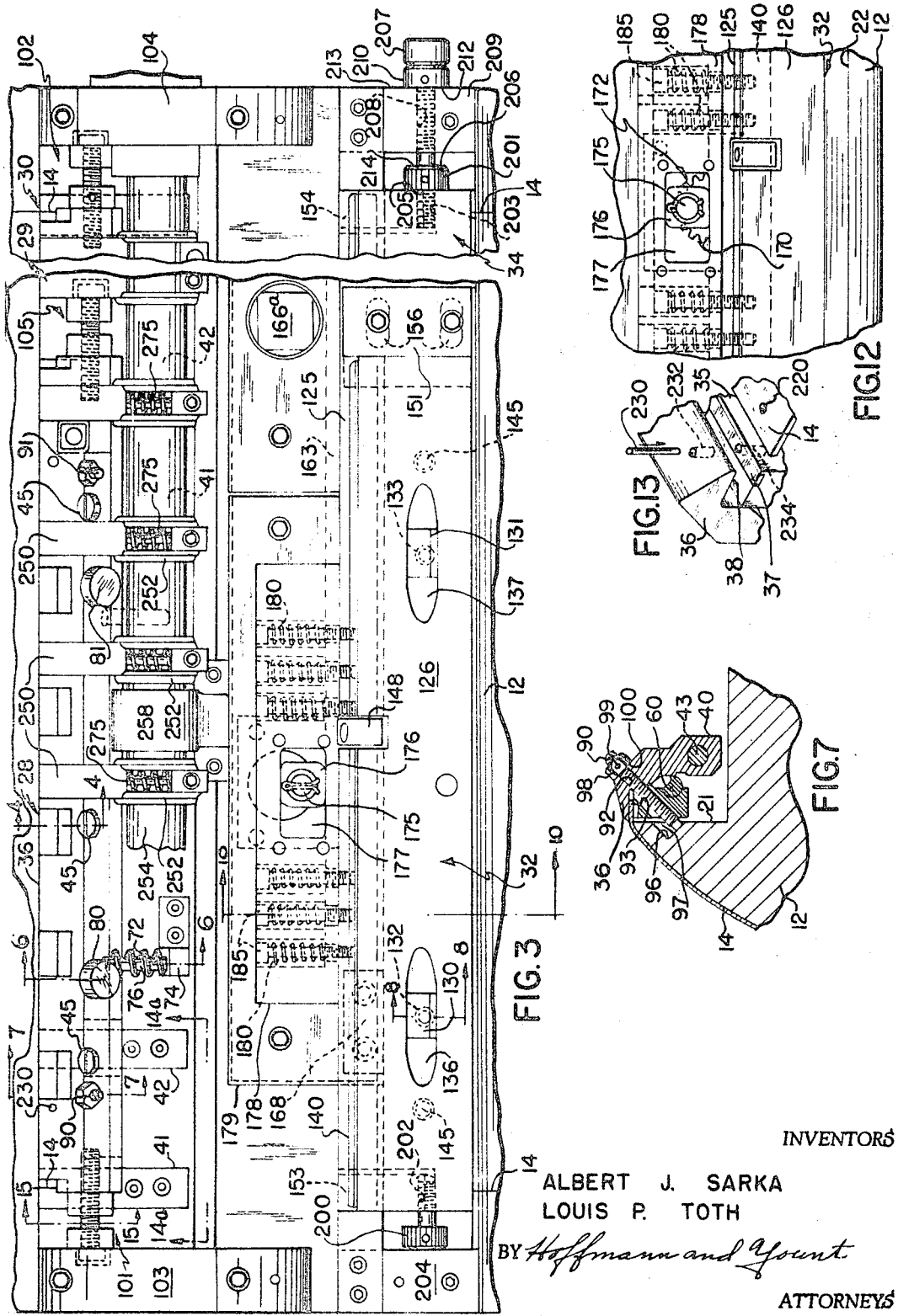

BY Hoffmann and Yount

ATTORNEYS

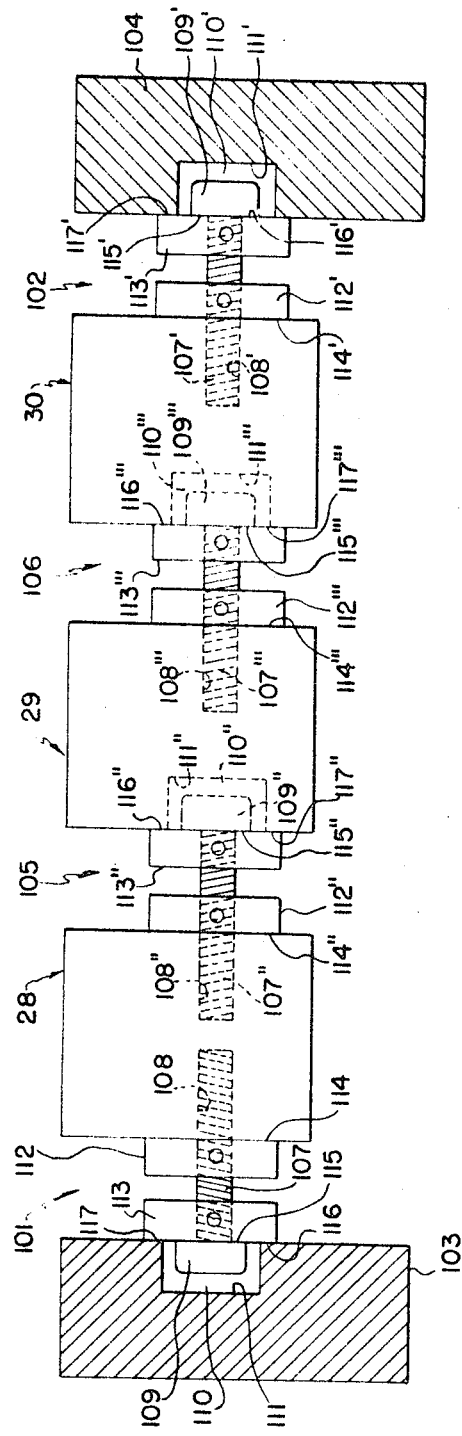

United States Patent Office 3,460,443
Patented Aug. 12, 1969

3,460,443
APPARATUS FOR OPERATING ON SHEET
MATERIAL
Albert J. Sarka, Fairview Park, and Louis P. Toth, Broadview Heights, Ohio, assignors to Harris-Intertype Corporation, Cleveland, Ohio, a corporation of Delaware
Filed Sept. 20, 1965, Ser. No. 488,349
Int. Cl. B31b 1/14; B31d 1/00
U.S. Cl. 93—58.2                       26 Claims

ABSTRACT OF THE DISCLOSURE

Disclosed herein is an apparatus including a plate cylinder having leading and trailing end clamp assemblies for securely holding on the cylinder a plate for working sheet material. A gripper assembly is provided for releasably engaging the sheet material. The plate clamp assemblies are adjustable axially and circumferentially of the cylinder to enable the plate to be aligned with the cylinder and held under tension in engagement with an outer surface above the cylinder. A triangulated pin registration system is provided to enable the plate to be readily aligned by movement of one of the clamp assemblies.

---

The present invention relates to an apparatus for operating on sheet material, and more particularly to such an apparatus having a rotatable plate cylinder carrying plate clamping means for clamping a pattern carrying plate thereto which is adapted to operate on the sheet material.

An object of the present invention is to provide a new and improved apparatus for operating on sheet material and which apparatus includes a rotatable plate cylinder carrying plate clamping means for gripping one or more pattern carrying plates and for holding the pattern carrying plate or plates under tension in tight wrapped engagement with the periphery of the plate cylinder, and which plate clamping means is so constructed and arranged that the plate or plates can be rapidly and readily attached to the cylinder and that the plate or plates cannot be over tensioned so as to cause permanent deformation thereof.

Another object of the present invention is to provide a new and improved cutting and/or creasing apparatus for cutting and/or creasing sheet material, and which apparatus includes a rotatable plate cylinder carrying plate clamping means for gripping a metal die plate having cutting and/or creasing elements thereon for cutting and/or creasing the sheet material and for holding the metal die plate under tension and in tight wrapped engagement with the periphery of the plate cylinder, and which plate clamping means is so constructed and arranged that the metal die plate can be rapidly and readily attached to the cylinder and that the plate cannot be over tensioned so as to cause permanent deformation thereof.

Yet another object of the present invention is to provide a new and improved cutting and creasing apparatus for cutting and/or creasing sheet material, and which apparatus comprises a rotatable plate cylinder carrying plate clamping means for gripping a metal die plate having cutting and/or creasing elements thereon for cutting and/or creasing the sheet material and including a plate tensioning mechanism for holding the metal die plate under tension and in tight wrapped engagement with the periphery of the plate cylinder, and which plate clamping means is so constructed and arranged that the plate tensioning mechanism thereof yieldably holds the metal die plate in tight wrapped engagement with the periphery of the cylinder and that the plate tensioning mechanism when actuated to tension the plate cannot over tension the plate so as to cause permanent deformation thereof.

A further object of the present invention is to provide a new and improved sheet fed apparatus in which a sheet is to be operated on by a plate on a rotatable plate cylinder having an axially extending gap in the periphery thereof, plate clamping means disposed in the gap for gripping a pattern carrying plate, particularly a plate having cutting and/or creasing elements thereon, and gripper means disposed in the gap and cooperable with the plate clamping means for gripping the leading edge of a sheet to be operated upon, and which apparatus is so constructed and arranged that the clamping means grips the plate such that only a slight amount of bending of the plate is required and that the gripper means cooperates with the plate clamping means immediately adjacent the edge of the cylinder periphery at the gap to grip the sheet closely adjacent its leading edge at a location immediately adjacent the edge of the gap at the cylinder periphery to enable the plate to work on the sheet material closely adjacent its edge and thereby minimize sheet waste.

Another object of the present invention is to provide a new and improved apparatus for operating on sheet material, and which apparatus includes a rotatable plate cylinder carrying plate clamping means for gripping a pattern carrying plate which is adapted to operate on the sheet material and registering means for registering the plate relative to the cylinder, and which plate clamping means is so constructed and arranged that the pattern carrying plate can be rapidly and readily attached to the cylinder and readily registered relative thereto to thereby minimize the amount of set-up or make ready time required.

Another object of the present invention is to provide a new and improved apparatus for operating on sheet material, and which apparatus comprises a rotatable plate cylinder having an axially extending gap in the periphery thereof, plate clamping means disposed in the gap including plate clamping members supported by the cylinder for relative movement axially thereof in opposite directions from a predetermined plate receiving position, the plate clamping means including means for adjusting the clamping members axially relative the plate cylinder from the predetermined plate receiving position and for restoring the plate clamping members to the predetermined plate receiving position relative to the cylinder, and which means is of a simplified construction and constructed and arranged such that the plate clamping members can be rapidly and readily adjusted from and restored to the predetermined plate receiving position.

A further object of the present invention is to provide a new and improved apparatus for operating on sheet material, and which apparatus comprises a rotatable plate cylinder having an axially extending gap in the periphery thereof, plate clamping means disposed in the gap including a plurality of spaced plate clamping units extending along one side of the gap for gripping one or more pattern carrying plates which are adapted to operate on the sheet material and with the plate clamping means being so constructed and arranged that the plate clamping units can be simultaneously or individually adjusted axially relative to the cylinder in opposite directions from their predetermined plate receiving positions and rapidly and accurately restored to their predetermined plate receiving positions.

Further objects and advantages of the present invention will be apparent from the following detailed description of the preferred embodiment thereof made with reference to the accompanying drawings forming a part of the present specification and in which:

FIG. 2 is a fragmentary plan view of the lowermost plate cylinder shown in FIG. 1;

FIG. 3 is an enlarged fragmentary plan view of part of the plate cylinder shown in FIG. 2;

FIG. 4 is a fragmentary sectional view taken approximately along line 4—4 of FIG. 3;

FIG. 5 is a fragmentary sectional view showing the same parts as shown in FIG. 4 but in a different position;

FIG. 6 is a fragmentary sectional view taken approximately along line 6—6 of FIG. 3;

FIG. 7 is a fragmentary sectional view taken approximately along line 7—7 of FIG. 3;

FIG. 12 is a fragmentary plan view of part of the apparatus shown in FIG. 3 but showing certain parts thereof in different positions;

FIG. 13 is a fragmentary perspective view of part of the apparatus shown in FIG. 2;

FIG. 15 is a fragmentary sectional view taken approximately along line 15—15 of FIG. 3; and FIG. 16 is a diagrammatic view of part of the apparatus shown in FIG. 2.

Figure 1:
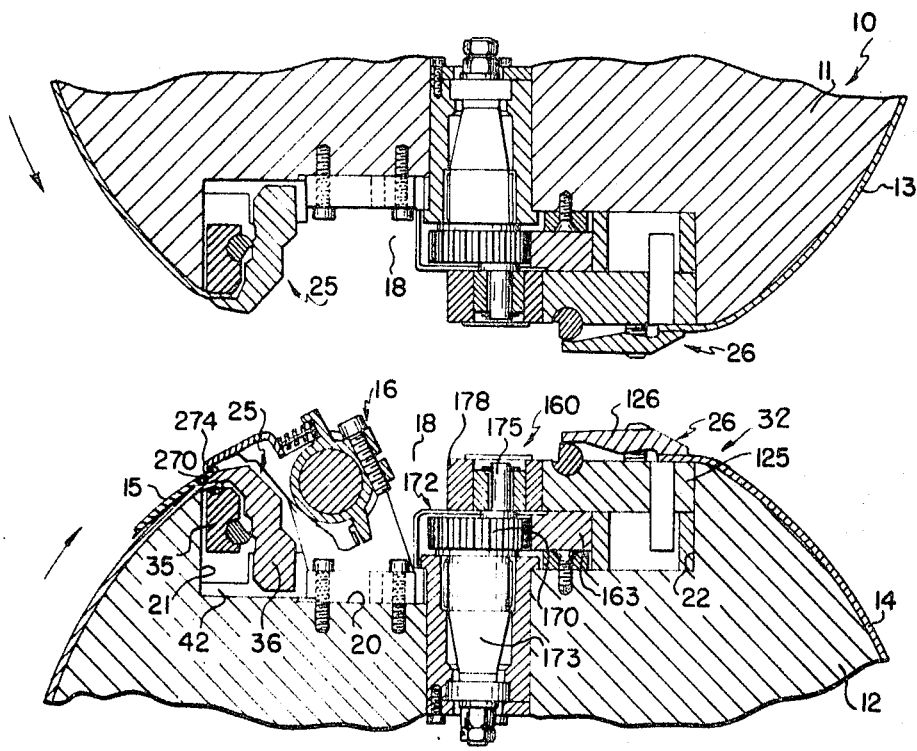
FIG. 1 is an enlarged fragmentary sectional view of a pair of rotatable plate cylinders comprising a part of the apparatus of the present invention and in which the fragmentary sectional view of the lowermost cylinder is taken approximately along line 1—1 of FIG. 2.

The present invention relates to apparatus wherein sheet material is operated upon by a plate, such as a metal plate having cutting and/or creasing elements thereon, mounted on a rotatable plate cylinder. While the present invention is usable in connection with various types of machines wherein plates for operating on sheet material are mounted on a rotatable plate cylinder, it is particularly useful in a cutting and creasing machine of the type generally disclosed in U.S. Patent No. 3,142,233 to Robert H. Downie and is herein shown as embodied in such a machine.

Referring to the drawings, the cutting and creasing apparatus is generally designated by reference numeral 10. The cutting and creasing apparatus 10 comprises cooperating upper and lower nip-forming plate cylinders 11 and 12 which are adapted to carry metal die plates 13 and 14, respectively, having cooperating integrally formed cutting and creasing elements or lands thereon. The plate cylinders 11 and 12 are rotatably supported at their opposite ends by side frames (not shown) and are adapted to be rotated in opposite directions, as indicated by the arrows in FIG. 1, and in synchronism by any suitable or conventional drive mechanism (not shown). As the plate cylinders 11 and 12 are rotated, the cooperating cutting and creasing elements on the die plates 13 and 14 operate on sheet material, here shown in the form of a sheet 15, advanced therebetween to cut and crease the same and in a manner disclosed in the aforementioned Downie Patent No. 3,142,233. The sheet 15 is advanced between the rotating plate cylinders 11 and 12 by a gripper means 16 on the lower plate cylinder 12. The sheet 15 which is advanced between the rotating cylinders 11 and 12 is cut so as to provide a pattern thereon which is defined by a plurality of cut and crease lines. The pattern may be that of a box blank or a plurality of box blanks which can thereafter be folded into a box.

Both plate cylinders 11 and 12 are identical in construction except that the lower plate cylinder 12 also carries the gripper means 16 and therefore, only the lower plate cylinder 12 will be described in detail. The plate cylinder 12 has a conventional axially extending gap 18 in the periphery thereof having a bottom 20 and opposite sides 21 and 22 extending parallel to the axis of the cylinder 12 and perpendicular to the bottom 20. The metal die plate 14 which is applied to the cylinder 12 extends about the cylinder 12 and is clamped at its opposite ends, which ends terminate adjacent the opposite sides 21 and 22 of the gap 18 by plate clamping means 25 and 26 disposed in the gap 18.

The plate clamping means 25 and 26 for clamping a plate to the cylinder 12 comprise, in the illustrated embodiment, three plate clamping units spaced axially along the side 21 for clamping the leading edge of the plate 14 and three oppositely disposed plate clamping units spaced axially along the side 22 of the gap 18 for clamping the trailing edge of the plate 14. The plate clamping units along the side 21 have been given the reference numerals 28, 29 and 30, respectively, proceeding from left to right as they are viewed in FIG. 2, and the trailing edge plate clamping units adjacent the side 22 have been given the reference numerals 32, 33 and 34, respectively, proceeding from left to right.

The plate clamping units 28, 29 and 30 are identical in construction and therefore, only the leftmost plate clamping unit 28, as viewed in FIG. 2, will be described in detail. Corresponding parts of the plate clamping units 29 and 30 will be given the same reference numerals as the parts of the plate clamping unit 28. Moreover, for the sake of description, the sides or ends of the plate clamping units 28–30 adjacent the side 21 of the gap 18 will be considered as the forward side and the sides or ends thereof nearer the center of gap 18 will be considered as the rearward side.

As viewed in the drawings, the plate clamping unit 28 comprises a pair of relatively movable plate clamping jaws or members 35 and 36. The jaw 35, which will hereinafter be referred to as the lower jaw, is in the form of an elongated bar having a generally flat plate clamping surface 37 facing outwardly of the gap 18 and located closely adjacent the side 21 at its line of intersection with the periphery of the cylinder 12. The jaw 36, which will hereinafter be referred to as the upper jaw, is disposed over the jaw 35 and is generally shaped like an inverted L, when viewed in cross section, as shown in FIG. 1. The upper jaw 36 has a generally flat plate clamping surface 38 facing inwardly toward the bottom 20 of the gap 18 and which is adapted to cooperate with the plate clamping surface 37 on the lower jaw 35 to clamp the leading edge of the metal die plate 14 therebetween. The plate clamping surfaces 37 and 38 extend parallel to the cylinder axis and generally perpendicular to the leading side 21 at the outer edge of the side 21 so that the leading edge of the plate 14 can be clamped without necessitating any sharp bending thereof.

The upper jaw 36 extends longitudinally along the side 21 and is pivotally mounted adjacent its opposite ends for rotational movement about an axis extending parallel to the cylinder axis. To this end the upper jaw 36 at its opposite ends has a downwardly extending lug portion 40 disposed between a pair of anchor blocks 41 and 42 and pivotally connected thereto by a pivot pin 43 slidably received in aligned through openings in the anchor blocks 41 and 42 and the lug portion 40. The pins 43 after being received in the aligned openings may be attached to lug portions 40 by set screws. The lug portions 40 have lengths which are less than the distance between the adjacent anchor blocks 41 and 42 to which they are pivotally connected so that the plate clamping unit 28 can be adjusted or moved axially of the gap 18 relative to the supporting anchor blocks 41 and 42 and for reasons which will hereinafter become apparent.

The plate clamping jaws 35 and 36 are movable relative to each other between an open position, as shown in FIG. 5 in which the leading edge of the die plate 14 can be positioned between the respective clamping surfaces 37 and 38 thereon and a closed position, as shown in FIG. 1, in which they are adapted to clamp the metal die plate 14 therebetween. The lower jam 35 is rockably supported from the upper jaw 36 by screws 45 which have heads that are received in counterbores 46 of respective openings 47 in the upper jaw 36 which receive the screws 45. The screws 45 extend through the openings 47 of the jaw 36 and thread into the lower jaw 35. The inner ends of the opening 47 are enlarged to allow the screws to move angularly and the underside 50 of the heads of the screws 45 are spherically curved and seated on the bottoms of the counterbores 46 which are curved in a complemental manner to form a ball type seat for the screw heads and support for the lower jaw 35 which allows the latter to rock relative to the upper jaw 36.

The plate clamping jaws 35 and 36 are biased to an open position by a plurality of compression springs 52 at longitudinally spaced apart locations therealong. The springs 52 are disposed inwardly of the cylinder from the lower jaw 35 and each is located in an individual counterbore portion 53 of a receiving transverse opening 54 in the upper jaw adjacent the inner end of its inwardly extending portion 55 and each surrounds a shank portion of a headed pin or member 56 slidably disposed within the opening 54. Each of the springs 52 has its opposite ends in abutment with the end of the counterbore 53 in the upper jaw 36 and a washer fixed to the rear end of the shank portion of the pin 56. The shank portion of each of the pins 56 extends through an oversized transverse opening 57 in the lower jaw 35 at its inner end. The head of each of the pins 56 has an arcuate or spherically curved undersurface 58 and the lower jaw 35 has complementary shaped recess 59 to receive the underside 58 of the head to form a rocking surface between the pin and the lower jaw 35.

The plate clamping jaws 35 and 36 are actuated between their open and clamped positions by a manually operable actuating rod 60 rockably received in a semicircular grooved opening 61 in the rearward side of the lower jaw 35. The actuating rod 60 is generally circular in cross section with a cut out portion 62 defining a lip 63. The forwardly facing side of the upper jaw has a stepped portion 64 which is adapted to be received by the cut out portion 62 when the actuating rod 60 is rotated to position the cut out portion 62 in a side-by-side relationship with the stepped portion 64 of the upper jaw 36. When the rod 60 is manually rotated to the position shown in FIG. 5, the cut out portion 62 receives the stepped portion 64 of the forward side of the upper jaw 36 and the springs 52 bias the upper and lower jaws 36 and 35 to their open position. When the rod is rotated to the position shown in FIG. 4, the lip 63 of the rod 60 engages the forward side of the upper jaw and the jaws 35 and 36 are moved against the bias imposed by the springs 52 to their clamped position.

The plate clamping unit 28 is biased toward the side 21 of the gap 18 by a plurality of rearwardly extending compression springs 70 (see FIG. 6) which are located at spaced apart locations along the plate clamping unit 28. Each of the springs 70 have one end in abutting engagement with the bottom of a recessed opening 72 in the upper jaw 36 and the other end in abutting engagement with an abutment member 74 bolted to the bottom 20 of the gap 18 and spaced rearwardly of the upper jaw 36. Each of the springs 70 are guided on a pin 76 secured to the abutment member 74 and projecting outwardly therefrom toward the opening 72.

To facilitate insertion and positioning of the leading edge of the die plate 14 between the jaws 35 and 36 of the plate clamping unit 28, provision is made for moving or swinging the plate clamping unit 28 about the axis of the pivot pins 43 away from the side 21 so that the plate clamping surface 37 of the lower jaw 35 will be positioned away from the side 21 and slightly above the outer edge of the side 21. To this end the actuating rod 60 at its opposed ends, which ends project beyond the ends of the lower jaw 35, has a lug or cam member 78 fixed thereon. When the rod 60 is rotated to actuate the jaws 35 and 36 from the clamped position to their open position, the cam members 78 are rotated toward and engage the side 21 to cause the plate clamping unit 28 to be swung about the pivot pins 43 in opposition to the bias imposed by the springs 70 in a direction away from the side wall 21 to the position shown by the solid lines in FIG. 15 to position the plate clamping surfaces 37 and 38 away from the side 21 so that the die plate 14 can be readily inserted therebetween. When the rod 60 is rotated to actuate the jaws 35 and 36 from their open position to their clamped position, the cam members 78 are rotated away from and out of engagement with the side 21 to the position shown in FIG. 9, or the dotted line position shown in FIG. 15. The plate clamping unit 28 is returned to its normal position when the cam members 78 disengage the side 21 by the springs 70.

The plate clamping means 25 includes adjusting means individual to each of the plate clamping units 28–30 for individually adjusting the latter in a circumferential direction, i.e., toward and away from the side. The plate clamping means 25 further includes positioning means individual to each of the plate clamping units 28–30 for individually positioning or restoring the plate clamping units 28–30 in a predetermined circumferential plate receiving position or location relative to the side 21 so that the plate 14 can be rapidly registered relative to the cylinder 12 when it is to be attached thereto, as will hereinafter become more fully apparent. Since the adjusting and positioning means for each of the plate clamping units 28–30 are identical in construction, only the adjusting and positioning means for the plate clamping unit 28 will be described in detail. Corresponding parts for the plate clamping units 29 and 30 will be given the same reference numerals as the parts for the plate clamping unit 28.

The adjusting means for moving the plate clamping unit 28 toward and from the leading side comprises a pair of jack screws 80 and 81 located at longitudinally spaced locations therealong. The jack screws 80 and 81 are each threadably engaged in a threaded opening 82 in the upper jaw 36 and project through an aligned diagonal opening 84 in the lower jaw 35 and each has its forward end or tip urged into abutting engagement with the bottom wall 85 of a cut out portion 86 in the side 21 by the action of the springs 70. By turning the jack screws 80 and 81 in a clockwise direction, the forward ends thereof bear on the walls 85 and cause the plate clamping unit 28 to pivot about the axis of the pins 43 and move away from the side 21 of the gap 18 in opposition to the bias imposed by the springs 70. To move the plate clamping unit 28 toward the side 21 of the gap 18, the jack screws 80 and 81 are turned in a counterclockwise direction, the springs 70 being effective to pivot the plate clamping unit 28 about the axis of the pins 43 toward the leading side 21.

The positioning means for positioning or restoring the plate clamping unit 28 in or to a predetermined circumferential position relative to the side 21 of the gap 18 comprises a pair of gauge screws 90 and 91 located at longitudinally spaced locations therealong. The gauge screws 90 and 91 are each threadably engaged with a threaded opening 92 in the upper jaw 36 and project through an aligned diagonal opening 93 in the lower jaw 35 and each has its forward end or tip normally urged into abutting engagement with a wall 96 of a recess 97 provided in the leading side 21 by the action of the springs 70. Each gauge screw 90 and 91 has a nut 98 threaded thereon at its rearward end portion and locked relative thereto by a set screw 99. The nuts 98 are locked relative to the gauge screws 90 and 91 so that their forward end faces or surfaces 100, or leftward end faces, as viewed in FIG. 7, which are adapted to abut the upper jaw 36, have a predetermined desired distance relationship with respect to the forward ends or tips of the screws 90 and 91. As shown in FIG. 7, when the tips of gauge screws 90 and 91 and the forward faces 100 of the nuts 98 are in abutting engagement with the walls 96 and the upper jaw 36, respectively, the plate clamping unit 28 is positioned or located in the desired predetermined circumferential position relative to the leading side 21. Each nut 98 is provided with radial holes to receive a tool to enable the gauge screws 90 and 91 to be backed off when the plate clamping unit 28 is to be adjusted or moved toward the leading side 21 of the gap 18. When the gauge screws 90 and 91 and the jack screws 80 and 81 are backed off, the springs 70 move the plate clamping unit 28 from its predetermined position toward the leading side 21 of the gap 18.

The plate clamping units 28–30 are supported by the plate cylinder 12 for simultaneous or individual adjustment axially or longitudinally thereof, i.e., in directions parallel to the axis of the plate cylinder 12, and can be positioned or restored to a predetermined plate receiving position or location axially relative to the cylinder 12. To this end, the plate clamping units 28 and 30 at their left and right ends, as viewed in FIGS. 2 and 16, carry combined adjustment and positioning means 101 and 102 which are operatively associated with the abutment blocks 103 and 104 secured to the bottom 20 of the gap 18 at the opposite ends of the cylinder 12, respectively. Likewise, the plate clamping units 28 and 29 at their right ends carry adjustment and positioning means 105 and 106 operatively associated with the left ends of the upper jaws of the plate clamping units 29 and 30, respectively. Since all of the adjustment and positioning means 101, 102, 105 and 106 are of an identical construction, only the adjustment and positioning means 101 will be described in detail, and corresponding parts of the adjustment and positioning means 102, 105 and 106 will be given like reference numerals but with a prime, double prime and triple prime affixed thereto, respectively.

The combined adjustment and positioning means 101 comprises a headed member or screw 107 threadably engaged with a threaded opening 108 in the upper jaw 36 of the plate clamping unit 28 and extending to the left therefrom, as viewed in FIG. 16. The screw 107 has a head 109 which is received within a recess 110 in the abutment block 103 and normally spaced to the right of the bottom wall 111 of the recess 110. The recess 110 is oversized so as to permit the plate clamping unit 28 to be moved toward and from the side by the jack screws 80, 81, as hereinbefore described. The screw 107 carries a pair of nuts 112 and 113 threadably engaged therewith and disposed between the upper jaw 36 of the plate clamping unit 28 and the abutment block 103. The nut 112 is fixed relative to the screw 107 as by a set screw or pin and its right end face 114, which forms a first fixed abutment surface on the screw 107, has a fixed distance relationship with the underside 115 of the head 109, which underside 115 forms a second fixed abutment surface on the screw 107. The nut 113 is threadably engaged with the screw 107 for turning movement relative to the screw 107 between the underside 115 of the head 109 and the nut 112. The right end face 114 of the nut 112 when engaged with a cooperating abutment surface on the left end of the upper jaw 36 serves to position the threaded member 107 relative to the plate clamping unit 28. The nut 113 when its left end face 116, which forms an abutment surface, engages the underside 115 of the head 109 and the right side 117 of the abutment member 103 positions plate clamping unit 28 is in its predetermined plate receiving position or location axially relative to the cylinder 12. When the plate clamping units 29 and 30 are in their predetermined plate receiving positions relative to the cylinder 12, the same abutting relationships exist between the means 102 and 105 and 106 and the associated abutment 104 and the left ends of the upper jaws 36, respectively. The plate clamping units 28–30 are retained in their predetermined positions by reason of the fact that the nuts on the screws are all in abutting engagement with their respective plate clamping units and associated abutments.

To adjust all of the plate clamping units 28–30 simultaneously toward the right, for example, the nut 113' is rotated to cause its end face 116' to be moved away from the abutment 104 and then the nut 112, which is fixed to the screw 107, is rotated to cause the screw 107 to be moved relative to the upper jaw 36 toward the abutment 103 until the head 109 thereof engages the bottom 111 of the recess 110. When this occurs, further rotational movement of the nut 112 in the same direction causes the plate clamping units 28–30 to be simultaneously moved toward the right. When the plate clamping units 28–30 have been adjusted the desired amount, the nut 113' is turned until it abuts the abutment 104. To restore the plate clamping units 28–30 to their predetermined position or location axially relative to the cylinder, the nut 112 is rotated to cause the screw 107 to be moved away from the abutment 103 until its right face 114 engages the upper jaw 36 of the plate clamping unit 28. Then the nut 113 is rotated until the left end face 116 thereof engages the underside 115 of the head 109. Then the nut 113' is rotated in the direction which moves the same away from the nut 112', the engagement between the abutment 104 and the nut 113' causing the plate clamping units 28–30 to be simultaneously moved toward the left until movement thereof is stopped by the engagement between the left end face 116 of the nut 113 and the side 117 of the abutment 103. When this occurs the clamping units 28–30 have been restored to their predetermined positions relative to the cylinder 12. To simultaneously adjust the plate clamping units toward the left, the nuts 113 and 112' are manipulated in the same manner that nuts 113' and 112 were manipulated when adjusting the plate clamping units 28–30 toward the right.

The plate clamping units 28–30 can also be axially adjusted individually relative to the cylinder and relative to each other in opposite directions from their predetermined plate receiving positions and thereafter restored to their predetermined plate receiving positions by suitably manipulating, as will presently be described, the respective adjusting and positioning means at their opposite ends. The end plate clamping unit 28 can be individually adjusted from its predetermined plate receiving position in either direction by manipulating the adjusting and positioning means 101 and 105 and in the same manner that the adjusting and positioning means 101 and 102 were manipulated to adjust all of the plate clamping units 28–30 simultaneously.

To individually adjust the middle plate clamping unit 29 toward the right, the nut 113''' is rotated in the direction to move the same away from the upper jaw of the plate clamping unit 30. Then the nut 112'' is rotated in the direction to cause the screw 107'' to be moved away from the upper jaw 36 of the plate clamping unit 28. As the screw 107'' is moved away from the plate clamping unit 28, the head 109'' thereof engages the bottom 111'' of the recess 110'' to cause the plate clamping unit 29 to be adjusted toward the right. The nut 113''' is then rotated, if necessary, until its end face 116''' engages the upper jaw of the plate clamping unit 30 to retain the plate clamping unit 29 in its adjusted position. The plate clamping unit 28 remains stationary during the adjusting of the plate clamping unit 29 because the nuts 113 and 112 are in engagement with the abutment 103 and the upper jaw 36 of the plate clamping unit 28, respectively.

To restore the plate clamping unit 29 to its predetermined plate receiving position, the nut 112'' is rotated in the direction to cause the screw 107'' to be moved toward the plate clamping unit 28 until the end face 115″ thereof engages the upper jaw 36 of the plate clamping unit 28. Then the nut 113‴ is rotated in the direction to move the same away from the plate clamping unit 29, the engagement between the right face 116‴ of the nut and the side 117‴ of the upper jaw 36 of the plate clamping unit 30 causing the plate clamping unit 29 to be moved toward the left until the underside 115‴ of the head 109‴ engages the end face 116‴ of the nut 113‴. When this occurs the plate clamping unit 29 has been restored to its predetermined position. Adjustment of the plate clamping unit 29 toward the left and its subsequent restoration to its predetermined plate receiving position is effected in the same manner that adjustment toward the right is effected except that nuts 112‴ and 113″ are manipulated instead of nuts 112″ and 113‴.

The plate clamping unit 30 is adjusted by manipulating the adjusting and positioning means 106 and 102 and in the same manner that the adjusting and positioning means 105 and 106 were manipulated for adjusting the plate clamping unit 29.

After the leading edge of the metal die plate 14 is gripped by the plate clamping units 28–30, the cylinder 12 is jogged or rotated until the plate 14 is wrapped around the cylinder under pressure from the cylinder 11. This wrapping takes place until only the trailing edge portion of the plate 14 remains free. The trailing edge of the plate is then gripped by the plate clamping units 32–34 of the plate clamping means 26.

The plate clamping units 32–34 for clamping the trailing side of the plate 14 are identical in construction and therefore, only the leftmost plate clamping unit, as viewed in FIG. 2, will be described in detail. Corresponding parts of the plate clamping units 33 and 34 will be given the same reference numerals as the parts of the plate clamping unit 32. Again for the sake of description, the sides of the plate clamping units 32–34 adjacent the side 22 of the gap 18 will be considered as the forward sides of these parts, and the sides near the center of the gap 18 will be considered the rearward sides thereof.

As best shown in FIG. 1, the plate clamping units 32 comprises a pair of relatively movable jaws or plate clamping members 125 and 126 extending longitudinally of the gap adjacent the side 22. The jaw 125, hereinafter referred to as the lower jaw, is in the form of an elongated bar having a generally flat plate clamping surface 127 facing outwardly of the gap and extending generally perpendicular to the side 22 at its line of intersection with the periphery of the cylinder 12. The jaw 126, hereinafter referred to as the upper jaw, has a plate clamping surface 128 facing inwardly of the gap 18 which is adapted to co-operate with the plate clamping surface 127 of the lower jaw 125 to clamp the trailing edge of the metal die plate 14 therebetween.

Figure 8:
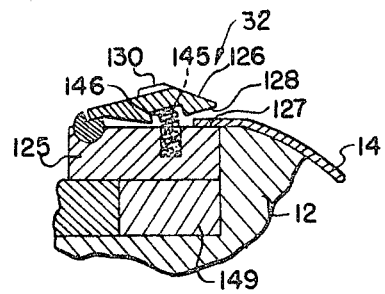
FIG. 8 is a fragmentary sectional view taken approximately along line 8—8 of FIG. 3.
Figure 14:
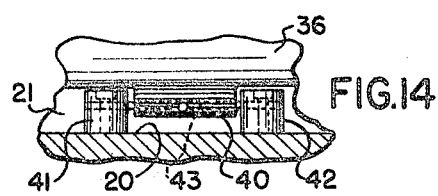
FIG. 14 is a fragmentary sectional view taken approximately along line 14—14 of FIG. 3.

The upper jaw is rockable on the lower jaw 125 and is rockable between an open position and a closed position in which it is adapted to clamp the plate 14 against the lower jaw 125. Threadably connected to the lower jaw 125 are a pair of studs 130 and 131 which extend upwardly therefrom through enlarged openings 132 and 133 in the upper jaw 126. The studs 130 and 131 each have a head which has an arcuate or curved underside 135 and which is curved along an axis extending longitudinally of and parallel to the upper jaw 126. The upper jaw has a pair of arcuate recesses 136 and 137 which receive the undersides 135 of the heads to form rocking surfaces for the upper jaw 126. The upper jaw 126 has an end portion 138 adjacent the center of the gap 18 disposed over an actuating rod 140 carried by the lower jaw 125. The rod 140 is rockably received in a semicircular groove opening 141 in the top of the lower jaw 125. The actuating rod 140 is generally circular in cross section with a cut out portion 142 adapted to receive the end portion 138 of the upper jaw 126 when the actuating rod is rotated to position the cut out 142 immediately under the end portion of the upper jaw 126. When the rod 140 is disposed to receive the end portion 138 of the upper jaw 126 in the cut out 142, a spring 145 which is positioned in a receiving bore in the lower jaw 125 and extends outwardly therefrom, as viewed in FIG. 8, to be received in a spring seat 146 formed in the underside of the upper jaw 126 moves the upper jaw 126 to its open position. When the actuating rod 140 is rotated to the position shown in FIG. 1 the upper jaw 126 is actuated against the bias of the spring 146 to a clamped position. The actuating rod has a collar 148 thereon which is bored to receive a wrench or tool for rotating the actuating rod 140.

The lower jaw of each of the plate clamping units 32–34 is slidably supported on a carrier bar 149 secured to the cylinder 12 for movement relative thereto toward and from the side 22 of the gap 18 and mounted to the cylinder 12 by retaining means 150. The retaining means 150 comprises a pair of plates 151 (only one of which is shown in the drawings) having tongue and groove type connections with the adjacent ends of the lower jaws of the plate clamping units 32 and 33, and 33 and 34, respectively, and a pair of plates 153 and 154 attached to the opposite ends of the cylinder 12 and having a tongue and groove type connection with the adjacent ends of the plate clamping units 32 and 34 respectively. The plates 151 are secured to the cylinder by bolts 155 which extend through slots 156 therein. The slots 156 extend axially of the cylinder 12 to permit the plate clamping units 32–34 to be adjusted or moved axially relative to the cylinder, and in a manner which will hereinafter be more fully described. The tongue and groove connection between the plates and the respective plate clamping units 32–34 retains the plate clamping units 32–34 within the gap 18 while permitting the plate clamping units 32–34 to be moved toward and from the trailing side 22.

One of the features of the present invention is the provision of a novel plate tensioning mechanism 160 for simultaneously moving the individual plate clamping units 32–34 in plate tension and plate tension relieving directions and for yieldably holding the plate 14 under tension in tight wrapped engagement with the cylinder 12. The plate tensioning mechanism 160 comprises an actuating means 162 operatively connected with the individual plate clamping units 32–34 for simultaneously moving the same in plate tensioning and plate tension relieving directions.

The actuating means 162 includes a rack 163 slidably supported on a bar 164 secured to the bottom 20 of the gap 18 for reciprocating movement axially relative to the cylinder 12. The rack 163 is provided with gear teeth along its side facing the center of the gap which are in constant mesh with a pinion gear 165 fixed to a shaft 166 rotatably supported by the plate cylinder 12 and extending perpendicular to the bottom 20 of the gap 18. The shaft 166 at its upper end, as viewed in FIG. 2, has a tool engaging outer end portion 166a to permit the shaft 166 to be manually rotated and cause the rack 163 to be moved. A pair of abutments or stops 168, 169 secured to the bottom 20 of the gap 18 are provided adjacent the opposite ends of the rack 163 to limit its movement in opposite directions.

The rack 163 is operatively connected to each of the plate clamping units 32–34 in the same manner and therefore, only the manner in which the plate clamping unit 32 is operatively connected to the rack 163 will be described in detail. The rack 163 is also in meshed engagement with a pinion gear 170 of an eccentric means 172 for moving the plate clamping unit 32. The pinion gear 170 of the eccentric means 172 is fixed to a shaft 173 rotatably supported by the plate cylinder. The eccentric means 172 further includes an eccentric pin 175 secured to the gear 170 at a location radially spaced from its center. The pin 175 is pivotally connected to a square shaped block 176 slidably disposed within a rectangular slot 177 in an actuating bar or member 178, the slot 177 extending parallel to the direction of movement of the rack 163. The actuating member 178 is slidably supported on a carrier bar 179 secured to the bottom 20 of the gap 18 for movement toward and from the trailing side 22.

Figure 10:
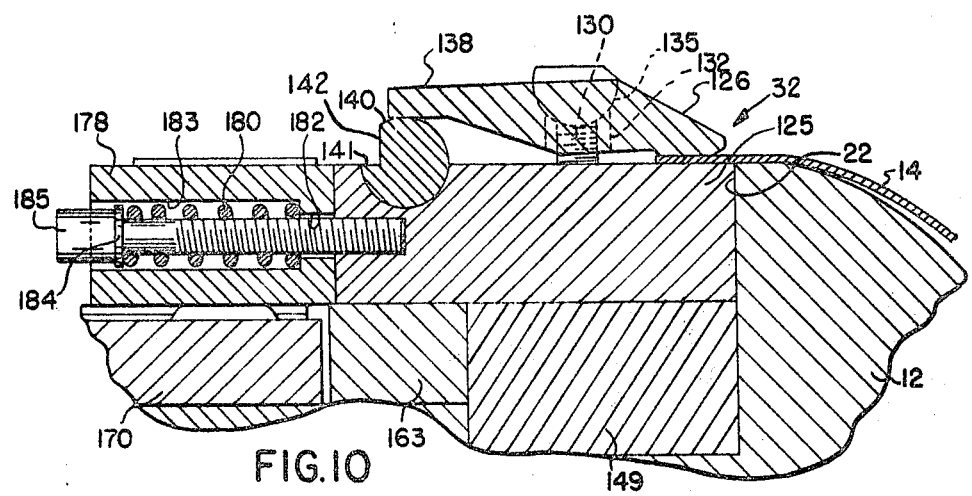
FIG. 10 is an enlarged fragmentary sectional view taken approximately along line 10—10 of FIG. 3.

The actuating member 178 is operatively interconnected with the plate clamping unit 32 and biased toward the plate clamping unit 32 by a plurality of compression springs 180. In the preferred embodiment shown, six springs are employed, three located to the left of the eccentric means 172 and three located to the right of the eccentric means 172, as viewed in FIG. 3. To this end the member 178 is provided with six transverse openings 182 extending therethrough, each of which has a counterbore 183 formed within the end portion adjacent the center of the gap 18, as best shown in FIG. 10. The springs 180 are disposed within the counterbore portions 183 of the openings 182 and each of the springs 180 has one end in abutment with the bottom of its respective counterbore 183 and the other end in abutment with a washer 184 which in turn is in abutment against a head of a bolt 185 extending through the opening 182 and threadably engaged with the lower jaw 125 of the plate clamping unit 32.

Figure 11:
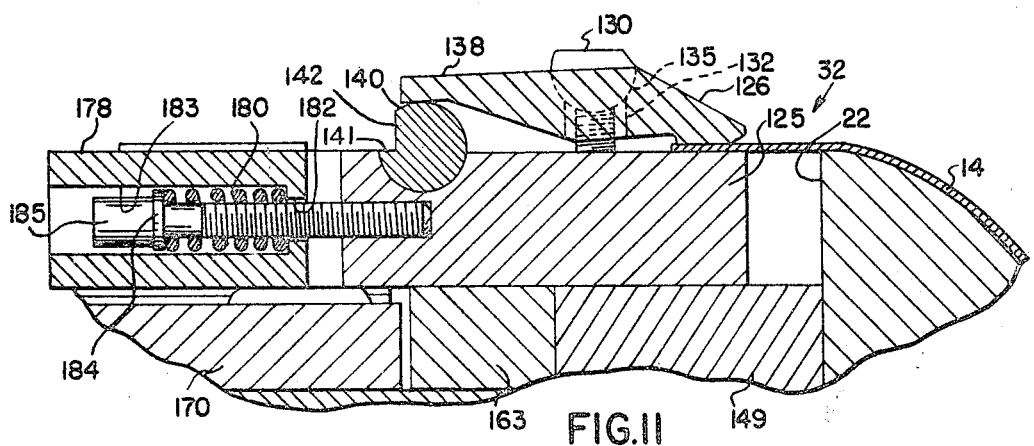
FIG. 11 is an enlarged fragmentary sectional view showing the same parts as shown in FIG. 10 but in a different position.

The actuating member 178 is movable toward and from the side 22 between a first position, as shown in FIG. 10 wherein it abuts the plate clamping unit 32 and positions the latter against the side 22 and a second position as shown in FIG. 11, wherein it is spaced from the plate clamping unit 32 and located adjacent the center of the gap 18. When the member 178 is moved from its first position toward its second position, the springs 180 cause the plate clamping unit 32 to move away from the side 22 until the resisting force of the plate 14 equals in magnitude the force exerted by the springs 180 whereupon the member 178 moves relative to the plate clamping unit 32, the springs 180 functioning to hold the plate 14 under tension and in tight engagement with the periphery of the cylinder 12.

The plate 14 is tensioned, after the trailing edge of the plate 14 is clamped between the upper and lower jaws of the plate clamping units 32–34 when the latter are in engagement with the trailing side, by manually rotating the shaft 166 in a clockwise direction to cause the rack 163 to be moved in a leftward direction, as viewed in FIG. 2. As the rack 163 is moved in a leftward direction the eccentric means 172 are caused to rotate in a clockwise direction. Rotation of the eccentric means in this direction causes the actuating members 178 to be moved from their first position toward their second position to tension the plate 14. The springs 180 are of a sufficient strength such that the plate clamping units 32–34 are moved simultaneously in response to movement of the members 178 in a plate tensioning direction until the plate is in tight engagement with the periphery of the cylinder 12 whereupon the resisting force of the plate 14 equals or exceeds in magnitude the combined force exerted by the springs 180. When this occurs, further movement of the members 178 in a plate tensioning direction will cause the members 178 to move in opposition to the springs 180 relative to the plate clamping units 32–34 whereby the springs 180 yieldably hold the plate 14 under tension and in tight engagement with the periphery of the cylinder 12. The combined maximum force exertable by the springs 180 when the plate 14 is being placed or yieldably held under tension is such that the plate 14 will not be significantly stretched or permanently deformed. When the plate 14 is to be removed from the cylinder 12, the shaft 166 is manually rotated in a counterclockwise direction to cause the rack 163 to be moved toward the right. Movement of the rack 163 toward the right causes the eccentric means 172 to rotate in counterclockwise directions which in turn causes the members 178 to be moved toward the side 22 and relative to the plate clamping units 32–34 until they engage the latter whereupon both are moved toward the side 22.

The springs 180 cooperate with the actuating means 162 to retain the actuating members 178 for the plate clamping units 32–34 in their first and second positions when the latter are moved thereto by the actuating means 162. As previously mentioned, the rack 163 is movable between the abutments 168 and 169, and when engaged with the abutments it prevents further movement of the eccentric means 172. The distance the rack 163 travels between the abutments 168 and 169 is such that it causes the eccentric pins 175 of the eccentric means 172 to be moved between a generally bottom dead center position when the members 178 are in their first position, as shown in FIG. 3, and a position which is slightly over or past top dead center when the member 178 is in its second position, as viewed in FIG. 12. When the eccentric pins 175 are slightly past top dead center, the members 178 are retained in their second position because clockwise movement of the eccentric means 172 is prevented by the rack 163 being engaged with the abutment 168 and counterclockwise movement of the eccentric means 172 is prevented by reason of the springs 180 which are biasing the members 178 toward the associated plate clamping units 32–34 and hence, the eccentric means 172 in a clockwise direction.

The plate clamping means 26 includes an adjustment means for simultaneously adjusting the plate clamping units 32–34 axially relative to the cylinder 12, i.e., parallel to the axis of the plate cylinder 12, and a positioning means cooperable with the adjustment means for simultaneously positioning or restoring the plate clamping units 32–34 in a predetermined axial position relative to the cylinder 12. The adjustment means comprises a pair of jack screws 200, 201 threadably engaged in threaded openings 202, 203 in the left and right ends of the lower jaw members 125 of the plate clamping units 32 and 34, respectively, as viewed in FIG. 3. The jack screw 200 is axially movable relative to the lower jaw 125 of the plate clamping unit 32 toward and from an associated abutment 204 fixed to the cylinder 12 and spaced to the left of the plate clamping unit 32. The jack screw 201 is axially movable relative to the lower jaw 125 of the plate clamping unit 34 and has a head whose opposite end faces 205 and 206 define fixed abutment surfaces thereon. The end face 205 is adapted to engage a cooperating abutment surface on the lower jaw 125 of the plate clamping unit 34 to position the jack screw 201 relative to the lower jaw 125.

The positioning means comprises a gauge screw 207 threadably engaged with a transverse threaded opening 208 in a stationary abutment member 209 secured to the cylinder 12 and spaced to the right of the plate clamping unit 34. The gauge screw 207 to the right of the abutment 209 has a nut 210 fixed thereon, as by a set screw or pin. The nut 210 has an end face 212 defining an abutment surface which is adapted to engage a cooperating abutment surface 213 on the abutment member 209. The gauge screw has a tip or end 214 which has a fixed distance relationship with the end face 212 of the nut 210 and which is adapted to abut or engage the end face 206 of the jack screw 201.

The plate clamping means, in the preferred embodiment, is located in its predetermined plate receiving position axially relative to the cylinder 12 when it is centrally positioned between the abutments 204 and 209. When in this position, the left face 205 of the jack screw 201 abuts the lower jaw of the plate clamping unit 34 and the left face 212 of the nut 210 is in engagement with the abutment 209 and the tip 214 of the gauge screw 207 abuts the end face 206 of the jack screw 201. The abutting engagement between the tip of the gauge screw 207 and the jack screw 201 is maintained by positioning the jack screw 200 so that it abuts the stationary abutment 204. To simultaneously move the plate clamping units 32–34 towards the right, the gauge screw 207 is backed off and then the jack screw 200 is backed off. As the jack screw 200 is being backed off it bears against the abutment 204 which causes the plate clamping units 32–34 to be moved toward the right. To restore the plate clamping means 26 to its predetermined position, as shown in FIG. 3, the jack screw 200 is turned in the opposite direction and then the gauge screw 207 is turned in the opposite direction. As the gauge screw 207 is turned, the tip 214 thereof bears against the end face 206 of the jack screw 201 to cause the plate clamping units 32–34 to be moved toward the left until the left face 212 of the nut 210 engages the abutment 209. When this occurs, the plate clamping units 32–34 are positioned in their predetermined axial location relative to the cylinder. Adjustment of the plate clamping units 32–34 toward the left is effected by moving the jack screw 200 away from the abutment 204 and then backing off the jack screw 201, the latter bearing against the tip 214 of the screw 207 to cause the plate clamping units 32–34 to be moved toward the left. To restore the plate clamping units to their predetermined plate receiving position, the jack screws 200 and 201 are turned in the opposite directions.

Provision is made for accurately registering the die pattern on the metal die plates 13 and 14 relative to the cylinders 11 and 12. The provision includes a triangulated or three point pin registration system which enables the plates to be accurately registered or positioned relative to each of the cylinders 11 and 12. The plates 13 and 14 are each provided with three openings 220–222, which define therebetween an isosceles triangle. Two of the openings, 220 and 221, are located adjacent the leading edge of each plate and the other opening, 222, is located adjacent the trailing edge of each plate, the latter opening 222 being located midway between the two openings in the leading edge. The three openings 220–222 in each of the plates 13, 14 are located relative to the pattern on the die plate such that the pattern on the die plate has a predetermined relationship with respect to the openings.

Since both plates 13 and 14 are registered relative to the cylinders 11 and 12 in the same manner, only the manner in which the plate 14 is registered relative to the cylinder 12 will be described in detail. Prior to registering and clamping the plate 14 to the cylinder 12 the plate clamping units 28–30 and 32–34 thereof are restored or positioned in their predetermined plate receiving positions or locations relative to the cylinder, if necessary, and in a manner hereinbefore described. The pin registration system, previously referred to, comprises a pair of gauge pins 230 and 231 for positioning the openings 220 and 221 adjacent the leading edge of the plate 14 relative to the cylinder 12 prior to the leading edge being clamped. The gauge pins 230 and 231 (see FIGURES 2 and 13) are each adapted to be slidably received with a close fit in aligned openings 232 and 234 in the upper and lower jaws of the plate clamping units 28 and 30 adjacent their forward ends, respectively, and extend upwardly therefrom. To attach the leading edge of the plate 14 to the plate clamping units 28–30 the plate 14 is positioned between the upper and lower jaws of the plate clamping units 28–30 and the pins 230 and 231 inserted through the aligned openings 232 and 234 in the upper and lower jaws and through the openings 220 and 221 provided in the leading edge of the plate 14. The plate clamping units 28–30 are then actuated to their clamping positions to clamp the leading edge of the plate. The gauge pins 230 and 231 can then be removed, if desired.

After the leading edge of the plate 14 is clamped, the cylinder 12 is rotated or jogged until only the trailing edge of the plate 14 remains free. The plate clamping unit 33 is provided with a gauge pin 235 which is adapted to extend through aligned openings in the upper and lower jaws 126 and 125 at the end thereof adjacent the side 22. To attach the trailing edge of the plate 14 to the plate clamp 33 the gauge pin 235 is inserted through the aligned openings in the plate clamping jaws 125 and 126 and the opening 222 in the plate 14. The plate clamping units 32–34 are then actuated to their closed positions to grip the trailing edge of the plate. The plate 14 is then placed under tension to tightly hold the same on the cylinder 12 by the plate tensioning mechanism 160, as hereinbefore described. The carrier bar 149 which supports the lower jaw 125 has a slot 240 which receives the pin 235 to permit the same to be moved along with the plate clamping unit 33 when the latter is moved away from the side 22. To insure that the plate 14 is tightly wrapped around the cylinder 12, the operator can tap the cylinder 12 adjacent its leading edge with a tool to see if there is a hollow sound. If there is a hollow sound the operator can then individually move one or more of the plate clamping units 28–30 away from the leading side 21 in a circumferential direction so as to place greater tension on that portion or portions of the plate, and in a manner hereinbefore described.

If the openings 220–222 are the patterns on the plates 13 and 14 are in the proper relationship with one another, the use of the pin registration system described above for the plates 13 and 14 will usually assure that the patterns carried on the plates 13 and 14 are properly registered relative to the cylinders and hence properly registered relative to one another. However, in the event that the cooperating die patterns carried by the plates 13 and 14 are not properly registered relative to one another, either sideways, circumferentially or because they are skewed or in the event that the openings 220–221 in the plate are not properly located relative to the pattern, the plate clamping units 28–30 and 32–34 can be suitably adjusted, as hereinbefore described, to compensate for any misalignment which occurs. Moreover, provision can also be made to enable the cylinders 11 and 12 to be supported in the side frames (not shown) so that they can be moved relative to each other circumferentially laterally or both to compensate for any misalignment which occurs.

An advantage of the triangulated pin registration system is that when the patterns on the plate 13 and 14 are skewed relative to one another, they can be readily aligned in most instances by adjusting only the plate clamping units 28–30 sideways and circumferentially relative to the respective cylinders because the trailing end of each of the plates can pivot about the gauge pin 235 in the plate clamp unit 33.

Additionally each of the plate clamping units 28–30 are provided with a pair of gauge pin openings at their opposite ends and the plate clamping units 32 and 34 are provided with a gauge pin opening intermediate their ends to enable up to three plates to be clamped to each of the cylinders and registered relative thereto.

After the plates 13 and 14 have been mounted on the cylinders 11 and 12 and registered relative to one another, the cylinder 11 and 12 can be rotated and the cutting and creasing operation on the sheets 15 commenced. The sheet 15 is advanced between the cooperating cylinders 11 and 12 by the gripper means 16 disposed within the gap 18 of the cylinder 12. The gripper means 16 comprises a plurality of gripper elements or fingers 250 spaced apart longitudinally of the gap 18. Each of the gripper fingers 250 is carried by a split clamp 252 which is clamped to a shift 254 extending parallel to the axis of the cylinder 12. The shaft 254 is rotatably supported by a plurality of spaced apart brackets 258 fixed to the bottom of the gap of the cylinder 12.

Figure 9:
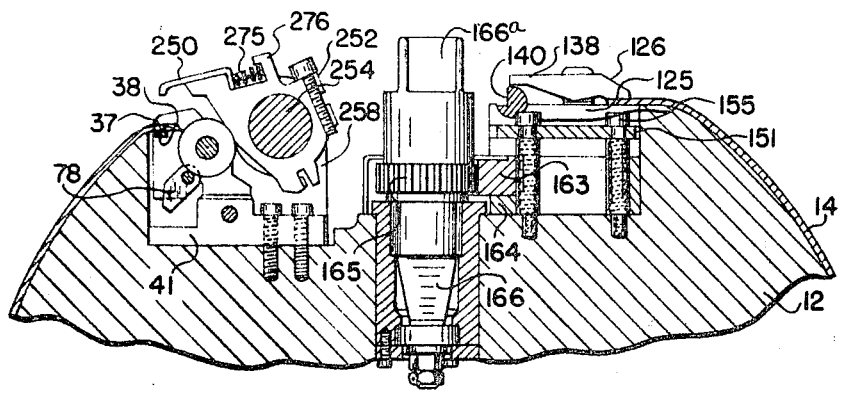
FIG. 9 is an enlarged fragmentary sectional view taken approximately along line 9—9 of FIG. 2.

The gripper fingers 250 are movable between a sheet gripping position, as shown in FIG. 1, wherein the gripper fingers 250 cooperate with the upper jaws of the plate clamping units 28–30 to grip the sheet 15 therebetween and a sheet releasing position, as shown in FIG. 9. To this end the pivotal shaft at its right end, as viewed in FIG. 2 has fixed thereto a lever member 260 which carries a rotatable cam roller 262 at its end. A suitable spring means (not shown) effective between the cylinder 12 and lever 260 is provided for urging or biasing the cam roller 262 into engagement with a suitable or conventional annular cam track carried or provided in the side frame (not shown) of the machine. The cam track is designed such that it causes the lever 260 to rotate the shaft to move the gripper fingers 250 between their sheet gripping and sheet releasing positions at predetermined points during each revolution of the cylinder 12.

The sheet gripping means 16 cooperates with the upper jaws of each of the plate clamping units in an identical manner, and therefore only the manner in which the gripper means 16 cooperates with the upper jaw 36 of the plate clamping unit 28 will be described. As best shown in FIG. 1 the upper jaw 36, which jaw serves as a gripper post, has a gripping surface 270 facing outwardly of the gap 18 and located closely adjacent the side 21 of the gap 18 at its line of intersection with the periphery of the cylinder 12 and which lies in a plane which is substantially tangential to the cylinder 12 at its line of intersection with the side 21. Each of the gripper fingers 250 has a forward end portion 274 which is bent toward the gripping surface 270 and located closely adjacent the periphery of the cylinder 12. Each of the gripper fingers 250 is biased toward the gripping surface 270 when in their sheet gripping position by a compression spring 275. The springs 275 have one end abutting a flange 276 on the split clamps 252 and the other end abutting the gripper fingers 250. The springs 275 exert a gripping force to enable the gripper fingers to tightly grip the sheet 15. From the above, it is apparent that the gripper fingers 250 grip the sheet 15 closely or immediately adjacent their ends or edges and at a location closely adjacent the edge of the gap and the periphery of the cylinder 12.

It is to be understood that the adjustment or movement of the plate clamping units toward and away from the adjacent sides 21 and 22 of the gap 18 is in plate tensioning and plate tension relieving directions, respectively. Moreover, it is to be understood that the term sheet material as used in the specification and claims encompasses sheet material which is either in web or sheet form.

While the preferred embodiment of the present invention has been described in considerable detail, it is hereby our intention to cover all constructions, modifications, and arrangements which fall within the ability of those skilled in the art and within the scope and spirit of the present invention.

Having described our invention, we claim:

1. An apparatus for operating on sheet material comprising a rotatable plate cylinder having an axially extending gap in the periphery thereof and plate clamping means mounted in said gap, said plate clamping means comprising a plate clamping unit slidably supported in said gap along one side thereof and having cooperable gripping portions for gripping a plate for operating on said sheet material and having a pattern thereon, said plate clamping means including a plate tensioning mechanism for moving said plate clamping unit away from said side in plate tensioning and toward said side in plate tension relieving directions and for yieldably holding said plate under tension in tight wrapped engagement with the periphery of said cylinder, said mechanism comprising an actuating member movable between first and second positions relative to said side and yieldable means operatively connected with said plate clamping unit and said actuating member, and actuating means for moving said actuating member between said first and second positions, said yieldable means when said member is moved from its first position toward its second position effecting movement of said plate clamping unit away from said side in a plate tensioning direction until the plate exerts a resisting force equal in magnitude to the force exerted by the yieldable means whereupon said actuating member moves relative to said plate clamping unit in opposition to said yieldable means whereby the yieldable means yieldably holds the plate under tension and in tight wrapped engagement with the periphery of the cylinder.

2. An apparatus for operating on sheet material comprising a rotatable plate cylinder having an axially extending gap in the periphery thereof and plate clamping means mounted in said gap, said plate clamping means comprising a plate clamping unit slidably supported in said gap along one side thereof and having cooperable gripping portions for gripping a plate for operating on said sheet material and having a pattern thereon, said plate clamping means including a plate tensioning mechanism for moving said plate clamping unit away from said side in plate tensioning and toward said side in plate tension relieving directions and for yieldably holding said plate under tension in tight wrapped engagement with the periphery of said cylinder, said mechanism comprising an actuating member slidably supported in said gap for movement toward and from said one side between first and second positions and spring means operatively connected with said plate clamping unit and said actuating member and biasing said actuating member toward said plate clamping unit, and actuating means for moving said actuating member between said first and second positions, said actuating member moving away from said side when being moved from said first position toward said second position, said spring means when said member is moved from its first position toward its second position being effective to move said plate clamping unit away from said side in a plate tensioning direction until the plate exerts a resisting force equal in magnitude to the force exerted by the spring means whereupon said member moves relative to said plate clamping unit in opposition to the spring means with the former remaining stationary whereby the spring means yieldably holds said plate under tension in tight wrapped engagement with said cylinder.

3. An apparatus as defined in claim 2, wherein said actuating means includes an eccentric means rotatably supported in said gap and operatively connected with said actuating member, and means for rotating said eccentric means in opposite directions and thereby cause said member to be moved toward and from said side.

4. An apparatus as defined in claim 2, including stop means operatively associated with said actuating means and engageable by said actuating member when said actuating member is in its second position limiting movement of said actuating member, said spring means being effective on said actuating member to urge said actuating member against said stop means when the actuating member is in its second position and to thereby resiliently retain said actuating means against movement.

5. An apparatus as defined in claim 3, wherein said means for rotating said eccentric means includes a rack and pinion drive.

6. A cutting and creasing apparatus for cutting and creasing sheet material comprising a rotatable plate cylinder having an axially extending gap in the periphery thereof and plate clamping means mounted in said gap, said plate clamping means comprising a plate clamping unit slidably supported in said gap along one side thereof and having cooperable gripping portions for gripping a plate having cutting and creasing elements thereon, said plate clamping means including a plate tensioning mechanism for moving said plate clamping unit away from said side in plate tensioning and toward said side in plate tension relieving directions and for yieldably holding said plate under tension in tight wrapped engagement with the periphery of the cylinder, said mechanism comprising an actuating member movable between first and second positions relative to said one side and yieldable means operatively connected with said plate clamping unit and said actuating member, and actuating means for moving said actuating member between said first and second positions, said yieldable means when said member is moved from its first position toward its second position effecting movement of said plate clamping unit in a plate tensioning direction until the plate exerts a resisting force equal in magnitude to the force exerted by the yieldable means whereupon said actuating member moves relative to said plate clamping unit in opposition to said yieldable means whereby the yieldable means yieldably holds the plate under tension and in tight wrapped engagement with the periphery of the cylinder.

7. A cutting and creasing apparatus for cutting and creasing sheet members comprising a rotatable plate cylinder having an axially extending gap in the periphery thereof and plate clamping means mounted in said gap, said plate clamping means comprising a plate clamping unit slidably supported in said gap along one side thereof and having cooperable gripping portions for gripping a plate having cutting and creasing elements thereon, said plate clamping means including a plate tensioning mechanism for moving said plate clamping unit relative to said one side in plate tensioning and plate tension relieving directions and for yieldably holding said plate under tension in tight wrapped engagement with the periphery of the cylinder, said mechanism comprising an actuating member slidably supported in said gap for movement towards and from said side between said first and second positions and spring means operatively connected with said plate clamping unit and said actuating member for biasing said actuating member toward said plate clamping unit, and actuating means for moving said actuating member between said first and second positions, said actuating member moving from said one side when being moved from said first position toward said second position, said spring means when said member is moved from its first position towards its second position being effective to move said plate clamping unit in a plate tensioning direction until the plate exerts the resisting force equal in magnitude to the force exerted by the spring means whereupon said member moves relative to said plate clamping unit in opposition to the spring means with the former remaining stationary whereby the spring means yieldably holds said plate under tension and in tight wrapped engagement with the cylinder.

8. An apparatus for operating on a sheet comprising, a rotatable plate cylinder having an axially extending gap in the periphery thereof and first and second clamping means disposed in said gap, said gap having first and second sides and said first and second plate clamping means comprising first and second plate clamping units supported by said cylinder and extending along said first and second sides, respectively, for gripping a plate for operating on said sheet and having a pattern thereon at its opposite ends, said first plate clamping unit comprising first and second relatively movable plate clamping members having cooperating plate clamping surfaces lying in planes extending transversely of said first side for clamping the plate therebetween, means for relatively moving said plate clamping members toward and from each other between plate clamping and plate releasing positions, respectively, sheet gripping means mounted on said cylinder in said gap adjacent said first side for gripping and advancing the sheet upon rotation of the cylinder, said sheet gripping means comprising a plurality of gripper elements movable toward and from a gripping surface on said second plate clamping member facing outwardly of said gap between a sheet gripping position in which said gripper elements cooperate with said gripping surface to grip the sheet and a sheet releasing position, respectively, said gripping surface on said second plate clamping member being located closely adjacent said first side at its line of intersection with the periphery of said cylinder whereby the sheet can be gripped closely adjacent the periphery of the cylinder, means for moving said gripper elements toward and from said gripping surface on said second clamping member between said sheet clamping and sheet releasing positions, said second plate clamping means including a plate tensioning mechanism for moving said second plate clamping unit relative to said second side in plate tensioning and plate tension relieving directions, said plate tensioning mechanism including yieldable means operatively connected with said second plate clamping unit for yieldably holding said plate under tension in tight wrapped engagement with the periphery of the cylinder when said second plate clamping unit is moved in a plate tensioning direction.

9. An apparatus for operating on a sheet comprising, a rotatable plate cylinder having an axially extending gap in the periphery thereof and first and second clamping means disposed in said gap, said gap having first and second sides and said first and second plate clamping means comprising first and second plate clamping units supported by said cylinder and extending along said first and second sides, respectively, for gripping a plate for operating on said sheet and having a pattern thereon at its opposite ends, said first plate clamping unit comprising first and second relatively movable plate clamping members having cooperating plate clamping surfaces lying in planes extending transversely of said first side for clamping the plate therebetween, means for relatively moving said plate clamping members toward and from each other between plate clamping and plate releasing positions, respectively, sheet gripping means mounted on said cylinder in said gap adjacent said first side for gripping and advancing the sheet between the cylinders, said sheet gripping means comprising a plurality of gripper elements movable toward and from a gripping surface on said second plate clamping member facing outwardly of said gap between a sheet gripping position in which said gripper elements cooperate with said gripping surface to grip the sheet and a sheet releasing position, respectively, said gripping surface on said second plate clamping member being located closely adjacent said first side at its line of intersection with the periphery of said cylinder whereby the sheet can be gripped closely adjacent the periphery of the cylinder, means for moving said gripper elements toward and from said gripping surface on said second clamping member between said sheet clamping and sheet releasing positions, plate clamping means operatively associated with said second plate clamping unit for moving said second plate clamping unit away from said second side of said gap to thereby apply tension to said plate and for moving said second plate clamping unit toward said second side of said gap to thereby relieve the tension applied to said plate, said plate clamping means including an actuating member movable relative to said second side between first and second positions and yieldable means operatively connected with said second plate clamping unit and said actuating member, actuating means for moving said actuating member between said first and second positions, said yieldable means being operative when said member is moved from its first position toward its second position for effecting movement of said plate clamping unit in a plate tensioning direction until the plate exerts a resistance force equal in magnitude to the force exerted by the yieldable means whereupon said actuating member moves relative to said plate clamping unit in opposition to said yieldable means whereby said yieldable means yieldably holds said plate under tension and in tight engagement with the periphery of said cylinder, and means for adjusting said first and second plate clamping units axially relative to the cylinder in opposite directions from a predetermined position relative to the cylinder and for restoring said first and second plate clamping units to their predetermined position relative to the cylinder.

10. An apparatus for operating on sheet material comprising, a rotatable plate cylinder having an axially extending gap in the periphery thereof and plate clamping means disposed in said gap, said plate clamping means comprising a first plate clamping unit supported by said cylinder and extending along one side thereof and a second plate clamping unit supported by said cylinder and extending along another side thereof, said first and second plate clamping units being adapted to grip a plate for operating on the sheet material and having a pattern thereon, said first plate clamping unit being supported by said cylinder for movement relative thereto from a predetermined plate receiving position, first registering means on opposite ends of said first plate clamping unit for registering one end of the plate relative to the cylinder, second registering means on said second plate clamping unit between said first registering means for registering and pivotally connecting another end of the plate to said second plate clamping unit, said first plate clamping unit being operable to pivot the plate relative to said second plate clamping unit and said second registering means to align the plate on said cylinder, said second plate clamping unit including a plate tensioning mechanism for moving said second plate clamping unit relative to said side after the plate is registered thereon and clamped thereto in a plate tensioning direction, said plate tensioning mechanism including yieldable means operatively connected with said second plate clamping unit for yieldably holding said plate under tension and in tight wrapped engagement with the periphery of the cylinder when said second plate clamping unit is moved in a plate tensioning direction.

11. An apparatus for operating on sheet material comprising a rotatable plate cylinder having an axially extending gap in the periphery thereof and plate clamping means disposed in said gap along one side thereof, said plate clamping means comprising relatively movable plate clamping members supported by said cylinder for movement axially thereof in opposite directions from a predetermined plate receiving position and having gripping portions thereon which are adapted to grip a pattern carrying plate, registering means on said plate clamping means for registering the pattern carrying plate to said cylinder when said clamping members are located in the predetermined plate receiving position, means for adjusting said plate clamping members axially relative to said cylinder from said predetermined plate receiving position and for restoring said plate clamping members to said predetermined plate receiving position, said last named means comprising a threaded member threadably connected with one of said plate clamping members and movable relative thereto in opposite directions axially of the cylinder, said threaded member having a first abutment surface fixed relative thereto and engageable with a cooperating abutment on said one plate clamping member to position the threaded member relative thereto, said threaded member having a second abutment surface fixed relative thereto, means for limiting axial movement of said threaded member when the latter is rotated in a direction to effect movement of the first abutment surface away from the cooperating abutment on said one plate clamping member to cause the plate clamping members to be moved in a first endwise direction axially relative to the cylinder from their predetermined plate receiving position, means for stopping movement of said second abutment surface in a predetermined plane relative to the cylinder to restore the plate clamping members to their predetermined plate receiving position when the plate clamping members are moved in a second endwise direction axially relative to the cylinder and when the first abutment surface is in engagement with the cooperating abutment surface on said one plate clamping member, and means for moving said plate clamping members in the second endwise direction.

12. An apparatus as defined in claim 11 wherein said threaded member has a head whose opposite end faces form said first and second abutment surfaces.

13. In an apparatus as defined in claim 11 wherein said means for limiting axial movement of said threaded member and for stopping said second abutment surface in said predetermined plane relative to the cylinder comprises a threaded element threadably connected with a stationary abutment means fixed to said cylinder and having a pair of fixed abutment surfaces thereon, one of which is engageable with a cooperating abutment surface on said threaded element to position the threaded element relative thereto and the other of which is engageable with said second abutment surface on said threaded member.

14. In an apparatus as defined in claim 13 wherein said threaded element has a tip forming the other of said pair of abutment surfaces thereon and carries a nut adjustably positionable thereon between its ends and having an end for forming said one abutment surface thereon, and means for locking said nut relative to the threaded element.

15. An apparatus, as defined in claim 11, wherein said threaded member carries first and second fixed abutment members having end faces defining said first and second abutment surfaces, respectively, and wherein said first abutment member can be adjustably fixed relative to the second abutment member, and locking means for adjustably fixing said first abutment member on said threaded member.

16. An apparatus as defined in claim 15 wherein said means for limiting movement of said threaded member away from said clamping members comprises an abutment means fixed to said cylinder and having an abutment surface which is engageable by said second abutment surface on said threaded member when the latter is rotated in a direction to cause the first abutment surface to be moved away from said one clamp member.

17. An apparatus as defined in claim 16 wherein said means for stopping movement of said second abutment surface in a predetermined plane relative to the cylinder when the plate clamping members are moved in the second direction comprises a movable abutment threadably engaged with said threaded member for movement relative thereto and having an abutment surface engageable with said second abutment surface on said second abutment and engageable with a second cooperating abutment surface on said abutment means to position the second abutment surface in said predetermined plane relative to the cylinder.

18. In a plate cylinder having an axially extending gap in its periphery and plate clamping means disposed in said gap for gripping a pattern carrying plate, said plate clamping means including a plate clamp member supported by said cylinder for endwise movement axially thereof in opposite directions toward and from an abutment means carried by the cylinder and spaced from one end of the plate clamping member, means for positioning the plate clamp member in a predetermined position relative to said abutment means and for adjusting the plate clamp member in opposite directions from said predetermined position, said last named means comprising a threaded member threadably connected to said plate clamp member at said one end and movable relative thereto toward and from said abutment means, said threaded member carrying a first abutment member fixed relative thereto and having an abutment surface engageable with a cooperating abutment surface on said one end of said plate clamp member to position the threaded member relative to the plate clamp member, said threaded member having a second fixed abutment member having an abutment surface having a fixed distance relationship with the abutment surface on said first abutment member, a third abutment member threadably engaged with said threaded member for movement axially relative thereto and having an abutment surface engageable with said abutment surface on said second abutment member and with a first cooperating abutment surface on said abutment means to position the plate clamp member in its predetermined position relative to said abutment means, said abutment means having a second abutment surface spaced from its first abutment surface in a direction away from said plate clamp member, said second abutment surface on said abutment means engaging said second abutment when the threaded member is rotated in a direction toward said abutment means to cause said plate clamping member to be moved endwise away from the abutment means, said abutment surface on said third abutment engaging said first cooperating abutment surface on said abutment means to restore the plate clamping member to its predetermined position relative to the abutment means when the plate clamping member is moved in an endwise direction toward said abutment means and when said abutment surfaces on said first and third abutments engage the clamp member and the second abutment, respectively, and means for moving said plate clamping member toward said abutment means.

19. A cutting and creasing apparatus for cutting and creasing sheet material comprising a rotatable plate cylinder having an axially extending gap in the periphery thereof, and plate clamping means disposed in said gap along one side thereof, said plate clamping means comprising relatively movable plate clamping members supported by said cylinder for movement axially thereof in opposite directions from a predetermined plate receiving position and having gripping portions thereon which are adapted to grip a plate having cutting and creasing elements thereon, registering means on said plate clamping means for registering the plate to said cylinder when said clamping members are located in the predetermined plate receiving position, means for adjusting said plate clamping members axially relative to said cylinder from said predetermined plate receiving position and for restoring said plate clamping members to said predetermined plate receiving position, said last named means comprising a threaded member threadably connected with one of said plate clamping members and movable relative thereto in opposite directions axially of the cylinder, said threaded member having a first abutment surface fixed relative thereto and engageable with a cooperating abutment surface on said one plate clamping member to position the threaded member relative thereto, said threaded member having a second abutment surfrace fixed relative thereto, means for limiting axial movement of said threaded member when the latter is rotated in a direction to effect movement of the first abutment surface to be moved away from the cooperating abutment surface on said one plate clamping member to cause the plate clamping members to be moved in a first endwise direction axially relative to the cylinder from their predetermined plate receiving position, means for stopping movement of said second abutment surface in a predetermined plane relative to the cylinder to restore the plate clamping members to their predetermined plate receiving position when the plate clamping members are moved in a second endwise direction axially relative to the cylinder toward their predetermined plate and when the first abutment surface is in engagement with the cooperating abutment surface on said one plate clamping member, and means for moving said plate clamping members in the second endwise direction.

20. A cutting and creasing apparatus for cutting and creasing sheet material comprising a rotatable plate cylinder having an axially extending gap having first and second sides in the periphery thereof, first and second plate clamping means disposed in said gap and extending alongside said first and second side, respectively, said first plate clamping means comprising relatively movable plate clamping members supported by said cylinder for movement as a unit axially thereof in opposite directions from a predetermined plate receiving position and having gripping portions thereon which are adapted to grip one end of a plate having cutting and creasing elements thereon, first registering means on the opposite ends of said first plate clamping means for registering one end of the plate thereto when said clamping members are in the predetermined plate receiving position, and second registering means on the second plate clamping means and located substantially midway between the registering means on the first plate clamping means for registering and pivotally connecting the other end of the plate to the second plate clamping means, said pivotal connection between the plate and the second plate clamping means enabling said plate to be pivoted thereabout.

21. A cutting and creasing apparatus as defined in claim 20 wherein said first registering means for registering the one end of the plate to said first plate clamping means comprises a pair of registering elements insertable through aligned holes in the plate and the first plate clamping means and wherein said second means for registering and pivotally connecting the other end of the plate to said second plate clamping means comprises a gauge pin insertable through aligned openings in said plate and said second plate clamping means.

22. An apparatus for operating on sheet material comprising a rotatable plate cylinder having an axially extending gap in the periphery thereof and plate clamping means disposed in said gap, said plate clamping means comprising a plate clamping unit extending along one side of the gap for gripping a plate having a pattern thereon for operating on said sheet material, said plate clamping unit being pivotally supported by said cylinder for movement toward and from said one side about a pivotal axis extending parallel to the axis of the cylinder, means for biasing said plate clamping unit toward said one side, said plate clamping unit comprising first and second relatively movable plate clamping members having cooperable plate clamping surfaces lying in planes extending transversely of one side and being located closely adjacent said one side at its line of intersection with the periphery of the cylinder for clamping the plate therebetween means for relatively moving said plate clamping members toward and from each other between plate clamping and plate releasing positions, respectively, and for moving said plate clamping unit in opposition to said biasing means about said pivotal axis away from said side so that a pattern carrying plate can be readily inserted between said cooperating clamping surfaces, said last named means including an actuating member carried by one of said plate clamping members and cooperably engageable with the other of said plate clamping members to relatively move said plate clamping members to a plate releasing position and a member carried by said actuating member and cooperably engageable with said side to move said plate clamping unit away from said side when said actuating member is actuated to move said plate clamping members to their plate releasing position.

23. An apparatus for operating on a sheet comprising a rotatable plate cylinder having an axially extending gap in the periphery thereof and plate clamping means disposed in said gap, said plate clamping means comprising a plate clamping unit supported by said cylinder and extending along a side of said gap which intersects an outer surface of said cylinder for gripping a plate extending at least partially around said outer surface of said cylinder for operating on said sheet and having a pattern thereon, said plate clamping unit comprising first and second relatively movable plate clamping members having cooperating plate clamping surfaces lying in planes extending transversely of said side and located closely adjacent to the periphery of said cylinder for clamping the plate therebetween, means for relatively moving said plate clamping members toward and from each other between plate clamping and plate releasing positions, respectively, sheet gripping means mounted on said cylinder in said gap adjacent said side for gripping and advancing said sheet, said sheet gripping means comprising a plurality of gripper elements movable between a sheet gripping position in which said gripper elements cooperate with a gripping surface to grip the sheet and a sheet releasing position, respectively, said gripping surface being formed on said second member closely adjacent the plane of said side at the periphery of the cylinder whereby said sheet can be gripped closely adjacent the periphery of the cylinder, and means for moving said gripping elements toward and from said gripping surface on said second clamping member between said sheet gripping and sheet releasing position, wherein said first plate clamping member is rockably supported by said second plate clamping member and is located radially inwardly of said second plate clamping member, and wherein said means for relatively moving said first and second plate clamping members between their plate clamping and plate releasing positions comprises biasing means operatively connected with said first and second plate clamping members for biasing them toward their plate releasing position and an actuating means disposed between said first and second plate clamping members for moving said first plate clamping member outwardly relative to said second plate clamping member in opposition to the bias imposed by said biasing means to move said first and second plate clamping members to their plate clamping positions.

24. An apparatus as defined in claim 23 wherein said actuating means includes a cam means movable into and out of operative engagement with said side of said gap, said cam means being moved into operative engagement with said side upon movement of said first and second plate clamping members to their plate releasing position to position said first and second plate clamping members outwardly of said side, said cam means being moved out of operative engagement with said side upon movement of said first and second plate clamping members to their plate clamping position to enable said first and second plate clamping member to move toward said side.

25. An apparatus for operating on a sheet comprising, a rotatable plate cylinder having an axially extending gap in the periphery thereof and first and second clamping means disposed in said gap, said gap having first and second sides and said first and second plate clamping means comprising first and second plate clamping units supported by said cylinder and extending along said first and second sides, respectively, for gripping a plate for operating on said sheet and having a pattern thereon at its opposite ends, said first plate clamping unit comprising first and second relatively movable plate clamping members having cooperating plate clamping surfaces lying in planes extending transversely of said first side for clamping the plate therebetween, means for relatively moving said plate clamping members toward and from each other between plate clamping and plate releasing positions, respectively, sheet gripping means mounted on said cylinder in said gap adjacent said first side for gripping and advancing the sheet between the cylinders, said sheet gripping means comprising a plurality of gripper elements movable toward and from a gripping surface on said second plate clamping member facing outwardly of said gap between a sheet gripping position in which said gripper elements cooperate with said gripping surface to grip the sheet and a sheet releasing position, respectively, said gripping surface on said second plate clamping member being located closely adjacent said first side at its line of intersection with the periphery of said cylinder whereby the sheet can be gripped closely adjacent the periphery of the cylinder, means for moving said gripper elements toward and from said gripping surface on said second clamping member between said sheet gripping and sheet releasing positions, first registering means on opposite ends of said first plate clamping unit for registering one end of the plate relative to the cylinder, second registering means on said second plate clamping unit between said first registering means for registering and pivotally connecting another end of the plate to said second plate clamping unit, said first plate clamping unit being operable to pivot the plate relative to said second plate clamping unit and said second registering means to align the plate on said cylinder, plate clamping means operatively associated with said second plate clamping unit for moving said second plate clamping unit away from said second side of said gap to thereby apply tension to said plate and for moving said second plate clamping unit toward said second side of said gap to thereby relieve the tension applied to said plate, said plate clamping means including an actuating member movable relative to said second side between first and second positions and yieldable means operatively connected with said second plate clamping unit and said actuating member, actuating means for moving said actuating member between said first and second positions, said yieldable means being operative when said member is moved from its first position toward its second position for effecting movement of said plate clamping unit in a plate tensioning direction until the plate exerts a resistance force equal in magnitude to the force exerted by the yieldable means whereupon said actuating member moves relative to said plate clamping unit in opposition to said yieldable means whereby said yieldable means yieldably holds said plate under tension and in tight engagement with the periphery of said cylinder, and means for adjusting said first and second plate clamping units axially relative to the cylinder in opposite directions from a predetermined position relative to the cylinder and for restoring said first and second plate clamping units to their predetermined positions relative to the cylinder.

26. An apparatus for operating on a sheet comprising a rotatable plate cylinder having an axially extending gap in a periphery thereof and plate clamping means disposed in said gap, said plate clamping means comprising a plate clamping unit supported by said cylinder and extending along a side of said gap which intersects an outer surface of said cylinder for gripping a plate extending at least partially around said outer surface of said cylinder for operating on said sheet and having a pattern thereon, said plate clamping unit comprising first and second relatively movable plate clamping members having cooperating plate clamping surfaces lying in planes extending transversely of said side and located closely adjacent to the periphery of said cylinder for clamping the plate therebetween, means for relatively moving said plate clamping members toward and from each other between plate clamping and plate releasing positions, respectively, sheet gripping means mounted on said cylinder in said gap adjacent said side for gripping and advancing said sheet, said sheet gripping means comprising a plurality of gripper elements movable between a sheet gripping position in which said gripper elements cooperate with a gripping surface to grip the sheet and a sheet releasing position, respectively, said gripping surface being formed on said second member closely adjacent the plane of said side at the periphery of the cylinder whereby said sheet can be gripped closely adjacent the periphery of the cylinder, and means for moving said gripping elements toward and from said gripping surface on said second clamping member between said sheet gripping and sheet releasing positions, said first plate clamping member being rockably supported by said second plate clamping member and located radially inwardly of said second plate clamping member, said means for relatively moving said first and second plate clamping members between their plate clamping and plate releasing positions including biasing means operatively connected with said first and second plate clamping members for biasing them toward their plate releasing position and an actuating means disposed between said first and second plate clamping members for moving said first plate clamping member outwardly relative to said second plate clamping member in opposition to the bias imposed by said biasing means to move said first and second plate clamping members to their plate clamping positions, said actuating means including a cam means movable into and out of operative engagement with said side of said gap, said cam means being moved into operative engagement with said side upon movement of said first and second plate clamping members to their plate releasing positions to position said first and second plate clamping members outwardly of said side, said cam means being moved out of operative engagement with said side upon movement of said first and second plate clamping members to their plate clamping position to enable said first and second plate clamping members to move toward said side.

References Cited

UNITED STATES PATENTS

| | | | |
|---|---|---|---|
| Re. 25,877 | 10/1965 | Norton | 101—415.1 |
| 1,304,732 | 5/1919 | Blaine. | |
| 1,482,391 | 2/1924 | English. | |
| 1,827,300 | 10/1931 | Pritchard. | |
| 1,913,392 | 6/1933 | Jacobson. | |
| 2,123,997 | 7/1938 | Jirousek | 101—415.1 |
| 2,767,653 | 10/1956 | Babicz | 101—415.1 X |
| 2,953,090 | 9/1960 | Scott | 101—415.1 X |
| 3,151,553 | 10/1964 | Norton | 101—415.1 |
| 3,203,346 | 8/1965 | Norton | 101—415.1 X |
| 3,359,899 | 12/1967 | Luehrs | 101—415.1 |
| 3,362,264 | 1/1968 | Broderick | 93—58.2 X |
| 2,670,662 | 3/1954 | Richards | 269—154 X |
| 3,375,762 | 4/1968 | Sarka | 93—58.2 |
| 3,383,991 | 5/1968 | Sarka | 93—58.2 |
| 3,335,663 | 8/1967 | Harenza | 101—415.1 |

WAYNE A. MORSE, Jr., Primary Examiner

U.S. Cl. X.R.

93—1, 58; 101—415